United States Patent [19]

Manning

[11] Patent Number: 5,207,717

[45] Date of Patent: May 4, 1993

[54] BOOK CARRIER FOR RECORDED AND PRINTED MATERIAL

[76] Inventor: Larry F. Manning, 4706 Kester, Sherman Oaks, Calif. 91403

[21] Appl. No.: 867,384

[22] Filed: Apr. 13, 1992

[51] Int. Cl.⁵ .................. B65D 85/57; B65D 85/575
[52] U.S. Cl. .................................. 206/232; 206/312; 206/387; 206/444; 206/472
[58] Field of Search ............. 206/45.31, 232, 307–313, 206/444, 472, 387

[56] References Cited

U.S. PATENT DOCUMENTS

| 3,722,564 | 3/1973 | Croon | 206/312 |
|---|---|---|---|
| 4,199,061 | 4/1980 | Harkleroad et al. | 206/232 |
| 4,511,034 | 4/1985 | Pan | 206/312 |
| 4,566,590 | 1/1986 | Manning et al. | 206/232 |
| 4,588,321 | 5/1986 | Egly | 206/444 |
| 4,776,463 | 10/1988 | Press | 206/312 |
| 4,793,477 | 12/1988 | Manning et al. | 206/232 |
| 4,828,105 | 5/1989 | Silengo et al. | 206/232 |
| 4,869,364 | 9/1989 | Bray | 206/232 |
| 4,993,552 | 2/1991 | Bugbey et al. | 206/309 |

FOREIGN PATENT DOCUMENTS 2187442  9/1987  United Kingdom ................. 206/444

Primary Examiner—Jimmy G. Foster
Attorney, Agent, or Firm—Roger A. Marrs

[57] ABSTRACT

A holder in the configuration of a book is disclosed herein for storing a variety of recorded and printed material such as compact discs, laser discs, cassettes, pictorial and message displays, etc. The holder includes an elongated spine integrally formed with foldable flaps on opposite edges of the spine. Each flap includes pockets for insertably receiving the recorded and printed material and is conformal in shape and size with the same.

1 Claim, 4 Drawing Sheets

BOOK CARRIER FOR RECORDED AND PRINTED MATERIAL

BACKGROUND OF THE INVENTION

1. Field of the Invention

The present invention relates to storage carriers or folders, and more particularly to a novel such folder which when folded resembles a conventional book and yet interiorly carries a cassette recording of a particulary book and which includes pockets for holding printed literature pertaining to the book so that indicia on the literature is available for visual observation similar to a book cover.

2. Brief Description of the Prior Art

It has been the conventional practice to provide a variety of folders, carriers and covers for recorded messages in either printed or photographic form. These carriers or folders are intended to protect the recorded information and to serve as a storage device for the particular material being housed. A typical example resides in the album cover for a record or a folded over book jacket cover for printed subject matter.

Problems and difficulties have been encountered with such conventional storage carriers or folders which stem largely from the fact that the carriers are not intended to hold thick items such as cassettes or cartridges holding standard tape recordings. Also, means must be provided for holding the standard tape cartridges or cassettes on the carrier so they may be readily and easily inserted for storage and removed for usage. Another problem in conventional storage carriers resides in the fact that the external appearance of the entire carrier does not resemble a book and, therefore, the association with the tape recording on the cassette containing recorded book information is lost.

Attempts have been made to solve the above problems which are represented by U.S. Pat. No. 4,793,477; however, a more universal and versatile holder is needed to accommodate a wider variety of different shaped and sized recordings and printed display subject matter.

SUMMARY OF THE INVENTION

Accordingly, the above problems and difficulties are obviated by the present invention which provides a novel holder taking the form of a book cover which houses a variety of recorded materials such as cassettes and discs, as well as printed subject matter which includes messages and pictorial representations on display sheets. The recordings and sheets are insertably received into pockets carried on flaps integrally formed with a fold-line to opposite edges of a central spine so that a substantially one-piece unitary construction is produced. In one form of the invention, the flaps and spine are composed of a transparent material and pockets for receiving printed and pictorial material are included in each flap whereby sheets of the material will be displayed through the transparent flap. Additional pockets are mounted on the inside of the flap pocket so as to accommodate recorded materials such as cassettes or discs so that the pictorial subject matter in the first pocket is associated with the recorded material in the second pocket carried on each flap. Therefore, the invention includes flaps on the opposite side of the spine on which there is internally carried a pair of pockets so that one pocket will insertably accept pictorial and message material on a display sheet while the other pocket will carry recorded information on cassette or disc.

Therefore, it is among the primary objects of the present invention to provide a novel holder of a book type for storing both recorded and printed material in such a way that the holder can be folded over upon itself and that its thickness will accommodate the thickness of the inserted printed and recorded material.

Another object of the present invention is to provide a novel holder that will accommodate a variety of shaped and sized recorded and printed materials without distortion from the book configuration intended.

Yet another object of the present invention is to provide a holder for storing printed and recorded material on one flap of a book-type cover holder and for storing recorded and printed subject matter on the opposite flap of the book-type cover so that the cover has improved acceptance for a variety of promotional materials combining both recorded and printed subject matter.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
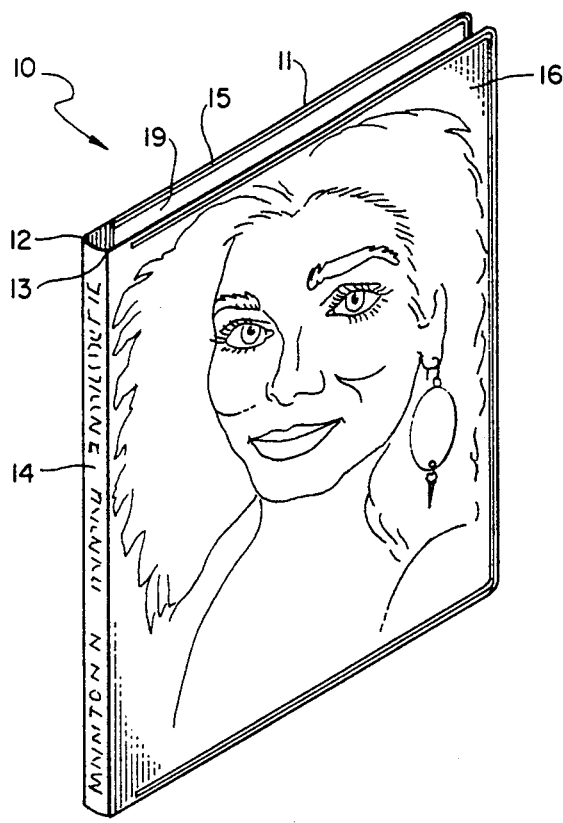
FIG. 1 is a front perspective view showing the novel holder of the present invention simulating a book cover.

Referring to FIG. 1, the novel holder of the present invention is illustrated in the general direction of arrow 10 which includes an elongated, rectangular sheet of material forming a backing sheet identified by numeral 11 which is folded over upon itself about a pair of score lines indicated by numerals 12 and 13 respectively. The score lines are placed in fixed spaced-apart parallel relationship on the interior surface of a backing sheet 11 and the score lines are spaced apart so that when the backing sheet is folded over about the score lines, the resultant article represents a book cover. The score lines are separated by an elongated spine or back 14. The backing sheet 11 includes a pair of flaps 15 and 16 that terminate in square corners which are aligned and adjacent to one another in spaced-apart relationship. Alignment also occurs when the flaps 15 and 16 are folded over so that the terminating edges are further aligned to represent a simulated book cover closure.

Figure 2:
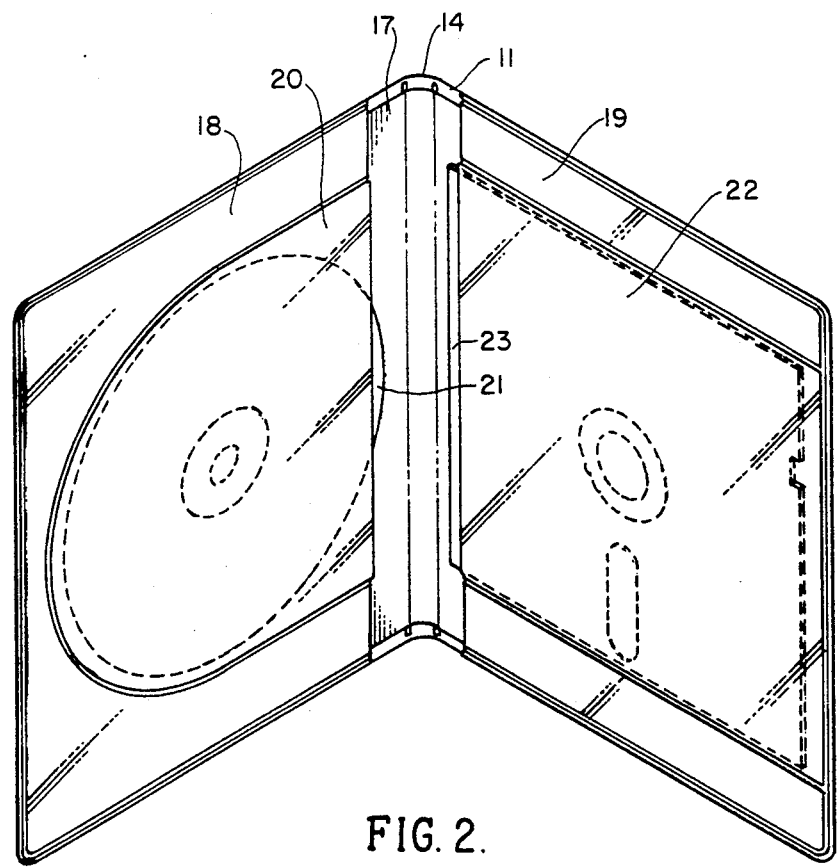
FIG. 2 is a view similar to the view of FIG. 1 with the holder opened to reveal the inside storage pockets.

As shown in FIGS. 1 and 2, an elongated sheet 17 is included so that its opposite ends are insertably received through the opposing openings of pockets 18 and 19 respectively. The edge marginal regions of the pockets and backing sheet 11 are joined together by heat-seeking techniques so that the pockets 18 and 19 are well defined. The exterior surface of sheet 17 may include pictorial subject matter such as the picture shown in FIG. 1 exposed through the transparency of the material forming the backing sheet 11. Also, indicia or message subject matter may be included on the exterior of the sheet 17 so that the message or indicia will appear through the back or spine 14.

With reference to FIG. 2, it can be seen that the pocket 19 further supports a second pocket identified by numeral 20 which is intended to receive a circular record or compact disc 21. Pocket 20 is of a circular nature so as to be conformal with the shape and configuration of the disc 21. In a similar manner, pocket 19 includes another pocket 22 carried thereon and which includes an opening for receiving a square information disc such as a floppy disc used in computers, and such a disc is identified by numeral 23.

Figure 3:
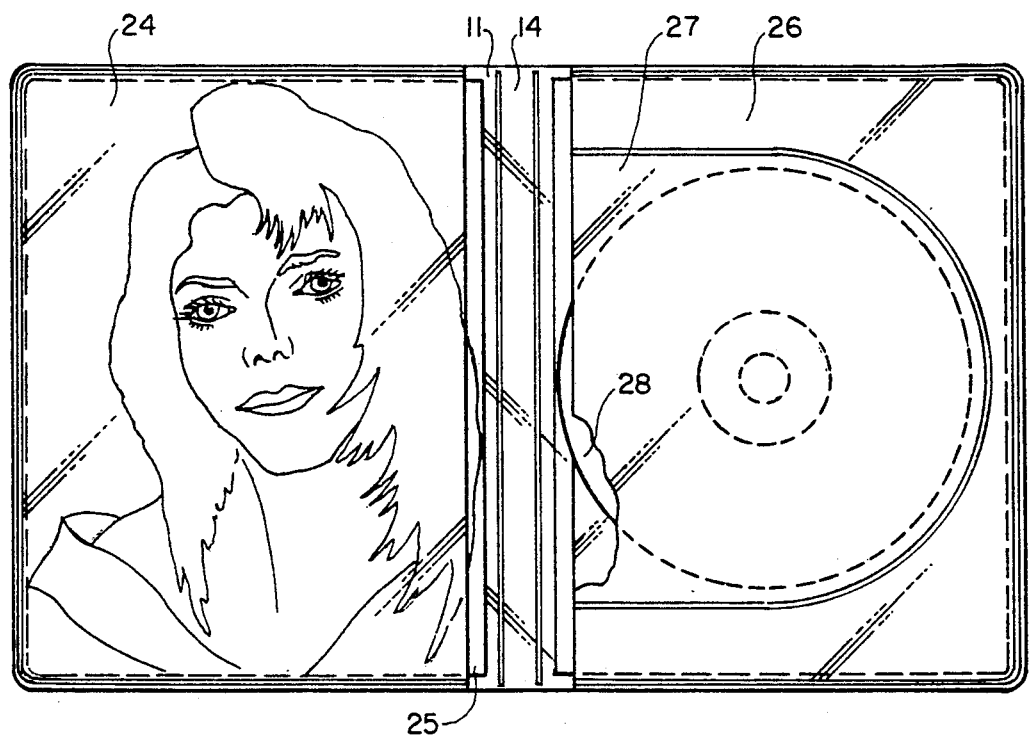
FIG. 3 is a view similar to the view of FIG. 2 illustrating a different version of the invention.

In FIG. 3, it can be seen that the backing sheet 11 supports a square pocket 24 and that square literature such as a photograph or the like, identified by numeral 25, may be inserted through the openings of the pocket. The pocket 24 is composed of a transparent material so that any pictorial or graphic subject matter shown on the sheet 25 will be displayed therethrough. The other side of sheet 11 includes a similar square pocket 26 and an auxiliary pocket 27 carried thereon for insertably receiving and storing a record disc or compact disc 28.

Figure 4:
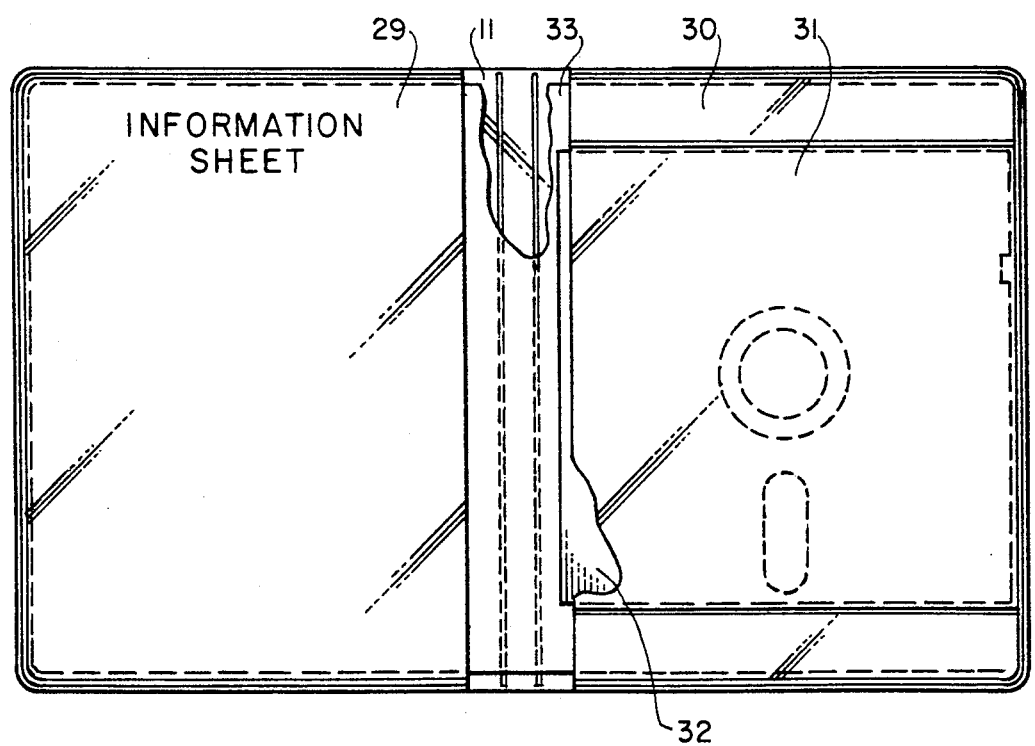
FIGS. 4-6 inclusive are similar views to the view of FIG. 3 illustrating different versions of the invention for holding a variety of recorded discs, cassettes and printed subject matter displays in accordance with the present invention.

Referring to FIG. 4, the sheet 11 includes a square pocket 29 on one side and a square pocket 30 on its opposite side. The square pocket 30 includes a square pocket 31 for supporting a floppy disc 32. In this instance, a pictorial or information sheet 33 includes indicia which will show through the transparency of the pocket 29 in addition to any pictorial or message information which is on the outside of the sheet.

Figure 5:
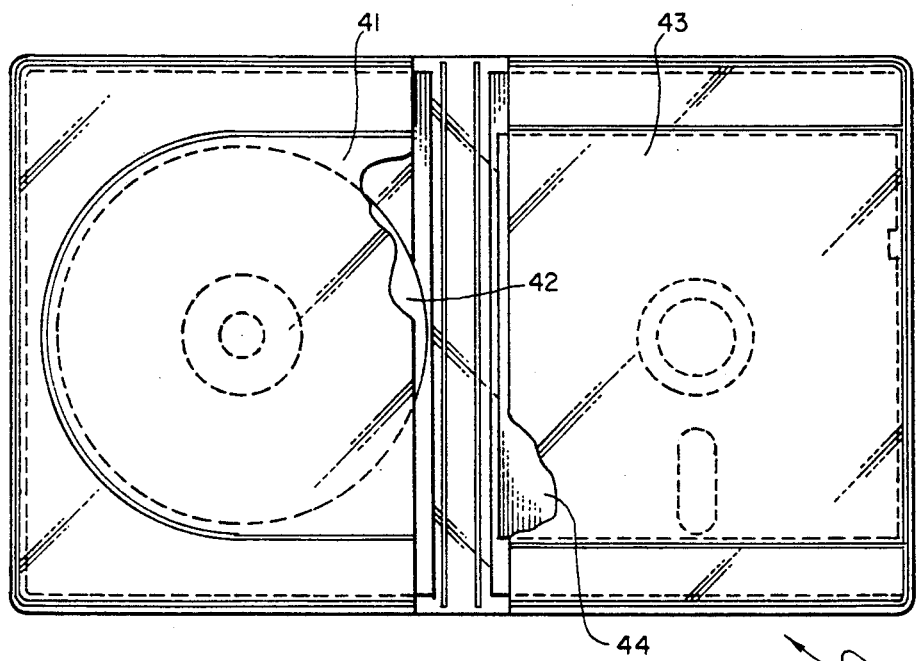
Figure 6:
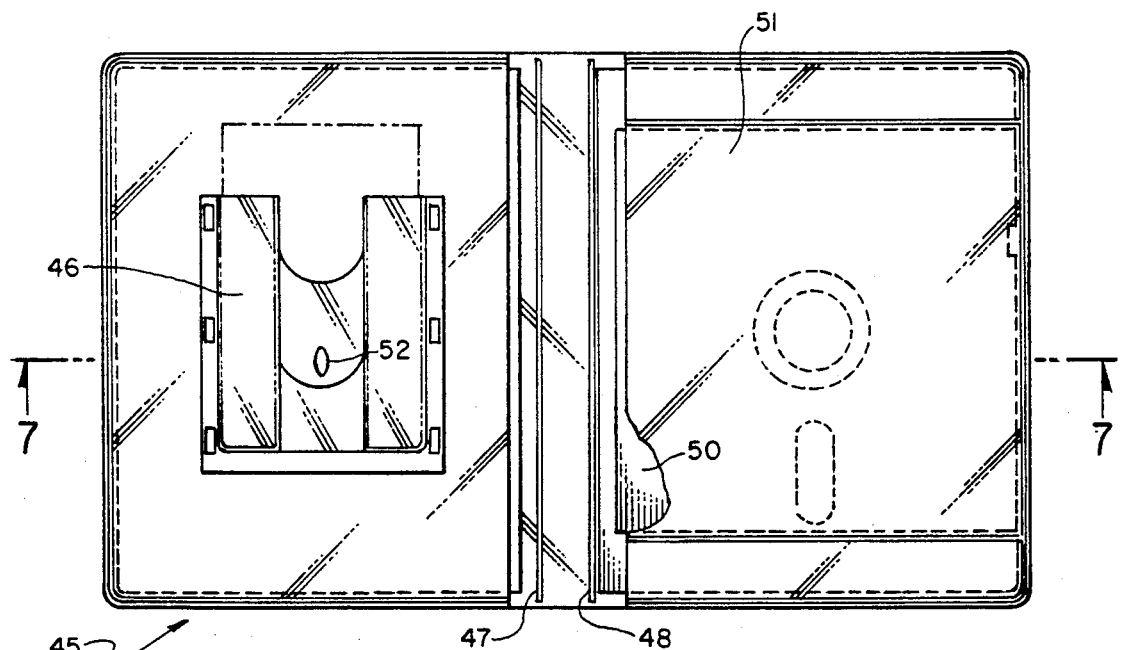
Figure 7:
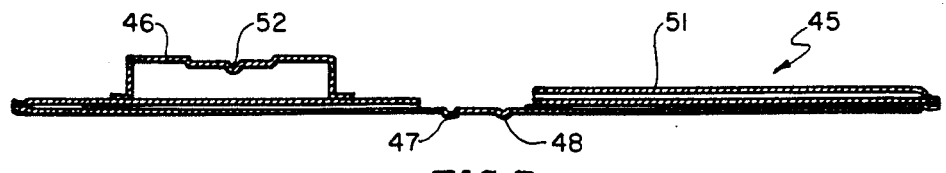
FIG. 7 is a transverse cross-sectional view of the embodiment shown in FIG. 6 as taken in the direction of arrows 7—7 thereof.

FIGS. 5-7 inclusive show other embodiments of the inventive concept. Numeral 40 is a carrier having a pocket 41 for insertably holding a record disc 42 on one side and a pocket 43 for carrying a floppy disc 44. FIGS. 6 and 7 illustrate a carrier 45 similar to the carrier 40 with one side supporting a cartridge or cassette holder for insertably receiving a recorded medium as indicated by numeral 46. The space or distance between the score lines 47 and 48 is sufficient to accommodate the thickness of the cassette holder. A floppy disc is shown by numeral 50 in its holding pocket 51.

FIG. 7 shows a detent 52 and for releasably engaging with the inserted cassette.

Figure 8:
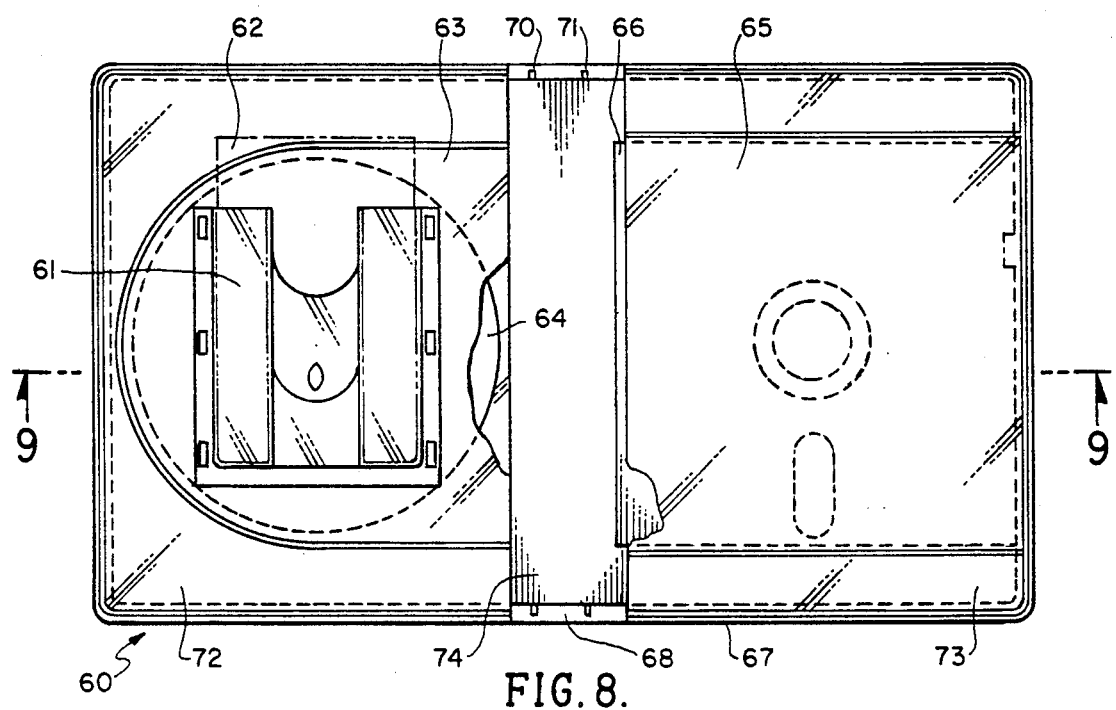
FIG. 8 is a front view similar to FIG. 6 but illustrating a different version of the invention.
Figure 9:
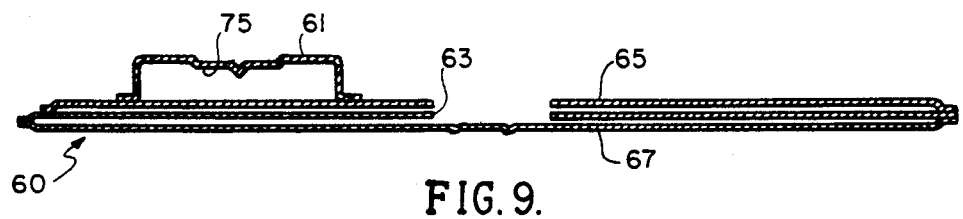
FIG. 9 is a transverse cross-sectional view of the embodiment shown in FIG. 8 taken in the direction of arrows 9—9 thereof.

FIGS. 8 and 9 show a carrier 60 having a pouch 61 for receiving a cartridge or cassette 62, having a pocket 63 which holds a compact disc 64 and having a second pocket 65 which holds a floppy disc 66.

A folder or carrier 60 simulates a book cover for holding a tape cassette 62, a compact disc 64 or floppy disc 66 which comprises:

An elongated rectangular backing sheet 67 of transparent material having opposite end portions separated by an elongated flat central strip 68 defined by parallel spaced-apart score lines 70 and 71 so that the backing sheet end portions fold over upon themselves about the respective score lines aligning the peripheral edges of the backing sheet end portions together to represent the cover of a book.

A pair of front sheets 72 and 73 carried against each of the backing sheet end portions which are secured to the peripheral edges thereof with unsecured edges opposing each other so as to constitute a pair of open pockets 63 and 65 facing each other in opposing relationship. An elongated rectangular sheet of foldable material 74 having indicia thereon is visually displayed through the end portions and central strip of the backing sheet and further having opposite ends insertably disposed within the pair of pockets wherein the sheet of foldable material is conformal in shape and configuration with said backing sheet.

The elongated pouch 61 is attached to one of the front sheets having an open end for slidably receiving the cassette or cartridge. The pouch has a rigid sidewall upstanding from the front sheet on which it is attached so that the pouch has a predetermined thickness. The central strip has a width substantially equal to said pouch sidewall thickness to separate the backing sheet end portions when folded over upon themselves so that the backing sheet end portion peripheral edges are aligned and conformal. The pouch has an open cavity for insertably receiving said cartridge or cassette and has a top sheet of material having its edge secured to the edge of said sidewall. The pouch top sheet is configured to conform to the shape and configuration of said cassette or cartridge.

A cantilevered protrusion 75 is carried on the top sheet projecting into the cavity for yieldable interference with the cassette or cartridge and each of said backing sheet end portions terminates its outer ends with squared corners with the squared corners of each end portion connected together by a straight edge. The end portion straight edges are arranged in parallel spaced-apart relationship and in alignment when the end portions are folded over.

The compact disc 64 has recorded data on both sides thereof insertably received into one of the open pockets. The flopping disc 66 is insertably received into the other open pocket and the backing sheet and the pair of front sheets are transparent to display indicia and pictorial subject matter carried on the sheet of foldable material.

In view of the foregoing, it can be seen that the holder of the present invention provides a variety of pockets for holding different sized and shaped printed sheets or recorded discs.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A folder or carrier simulating a book cover for holding a tape cassette, a compact disc or floppy disc comprising the combination of:

an elongated rectangular backing sheet of transparent material having opposite end portions separated by an elongated flat central strip defined by parallel spaced-apart score lines so that said backing sheet end portions fold over upon themselves about said respective score lines aligning the peripheral edges of said backing sheet end portions together to represent the cover of a book;

a pair of front sheets carried against each of said backing sheet end portions secured to said peripheral edges thereof with unsecured edges opposing each other so as to constitute a pair of open pockets facing each other in opposing relationship;

an elongated rectangular sheet of foldable material having indicia thereon visually displayed through said end portions and central strip of said backing sheet and further having opposite ends insertably disposed within said pair of pockets wherein said sheet of foldable material is conformal in shape and configuration with said backing sheet;

an elongated pouch attached to one of said front sheets having an open end for slidably receiving said cassette or cartridge;

said pouch having a rigid sidewall upstanding from said front sheet on which it is attached so that said pouch has a predetermined thickness;

said central strip having a width substantially equal to said pouch sidewall thickness to separate said backing sheet end portions when folded over upon themselves so that said backing sheet end portion peripheral edges are aligned and conformal;

said pouch having an open cavity for insertably receiving said cartridge or cassette;

said pouch having a top sheet of material having its edge secured to the edge of said sidewall;

said pouch top sheet configured to conform to the shape and configuration of said cassette or cartridge;

a cantilevered protrusion carried on said top sheet projecting into said cavity for yieldable interference with said cassette or cartridge;

each of said backing sheet end portions terminating their outer ends with squared corners;

said squared corners of each end portion connected together by a straight edge;

said end portion straight edges being arranged in parallel spaced-apart relationship and in alignment when said end portions are folded over;

a compact disc having recorded data on both sides thereof insertably received into one of said open pockets;

a floppy disc insertably received into the other open pocket; and said backing sheet and said pair of front sheets being transparent to display indicia and pictorial subject matter carried on said sheet of foldable material.

* * * * *